United States Patent [19]

Loyd

[11] 4,251,040
[45] Feb. 17, 1981

[54] WIND DRIVEN APPARATUS FOR POWER GENERATION

[76] Inventor: Miles L. Loyd, 4227 Colgate Way, Livermore, Calif. 94550

[21] Appl. No.: 968,503

[22] Filed: Dec. 11, 1978

[51] Int. Cl.$^3$ .......................... B64C 31/06; F03D 5/00
[52] U.S. Cl. .................................. 244/154; 244/1 R; 290/44; 290/55
[58] Field of Search ............... 244/1 R, 33, 58, 153 R, 244/154; 290/44, 45

[56] References Cited

U.S. PATENT DOCUMENTS

| | | | |
|---|---|---|---|
| 641,957 | 1/1900 | Heidel | 290/55 |
| 2,112,633 | 3/1938 | Moon | 290/55 |
| 3,227,398 | 1/1966 | Struble | 244/1 R |
| 3,987,987 | 10/1976 | Payne et al. | 244/153 R |
| 4,084,102 | 4/1978 | Fry et al. | 290/55 |

Primary Examiner—Charles E. Frankfort
Attorney, Agent, or Firm—James H. Laughlin, Jr.; C. Douglas McDonald

[57] ABSTRACT

Wind driven apparatus for the production of power at a ground location includes an aerodynamic lift generating vehicle capable of maintaining a stable airborne orientation, a tether linking the vehicle to a ground location, mechanical power generating equipment carried by the vehicle and responsive to relative motion between the air and the vehicle, apparatus for converting the generated power to reciprocating motion and structure for transmitting the reciprocating motion along the tether to the ground.

13 Claims, 9 Drawing Figures

WIND DRIVEN APPARATUS FOR POWER GENERATION

BACKGROUND OF THE INVENTION

This invention relates to apparatus for extracting mechanical power from wind. More particularly, it relates to apparatus of the nature of a flying windmill and means for transmitting the mechanical power from that flying windmill to the ground.

The best known type of device for generating mechanical power from the wind at a ground location is the conventional, tower-mounted windmill or wind turbine. While the tower-mounted wind turbines have proved satisfactory in many applications, they are generally limited by their relatively close proximity to the ground, thus resulting in their receiving winds of substantially lower speed and energy than are available higher in the air. In the prior art it has been recognized that improved performance can be obtained by aerodynamic support of the power producing structure, as disclosed in U.S. Pat. No. 3,924,827, U.S. Pat. No. 3,987,987, U.S. Pat. No. 4,076,190 and U.S. Pat. No. 4,084,102. These and other prior art have disclosed various types of unmanned kites controlled by the ground and containing some type of turbine for extraction of power from movement of the air over the kite.

It has been known that a kite may be aerodynamically supported either facing into the wind or tacking across the wind. When tacking across the wind, the kite velocity through the air may approximate the product of the wind speed and the lift-to-drag ratio of the vehicle or kite. If the kite is an aerodynamic lifting vehicle, its lift increases as a square of its velocity. As a result, the vehicle can pull larger loads and move the loads faster when travelling across the wind. By this increased speed, a turbine mounted to the kite vehicle may be caused to turn far faster than if the vehicle were simply facing into the wind, thus providing for the extraction of substantially greater power from the wind.

Disadvantages have arisen in the prior art in which a generator is carried on board the kite vehicle and driven by the wind turbine, since the weight of such a generator on board the vehicle may severely compromise its aerodynamic performance. In other prior art structures power has been extracted from the movement of the tether about a ground mounted base point, suffering the limitation that the power production is synchronously tied to the motion of the kite about the base point. The use of a rotating tether supported by a stationary vehicle suffers the disadvantage that extraction of the power from the wind by the turbine results in substantial drag, thus pulling the tether down to a low angle to the ground and reducing both its efficiency and its exposure to the higher velocity winds at greater altitude.

SUMMARY OF THE INVENTION

In view of the disadvantages of the prior art it is an object of the present invention to provide efficient airborne apparatus for extracting power from the wind and transmitting that power to the ground. Briefly, the invention provides wind driven apparatus for the production of power at a ground location and includes an aerodynamic vehicle for maintaining a stable airborne orientation, a tether linking the vehicle to the ground location, means carried by the vehicle for generating mechanical power from the relative motion between the air and the vehicle, means carried by the vehicle for converting that extracted power to reciprocating motion, and means for transmitting that reciprocating motion along the tether to the ground location.

In a particularly preferred embodiment of the invention the vehicle comprises a kite having the general configuration of an airplane, suitably launched by a catapult structure and thereafter flying a closed path generally across the wind, such as a circle spaced from the ground tether base a distance defined by the tether.

BRIEF DESCRIPTION OF THE DRAWINGS

A particularly preferred embodiment of the apparatus of this invention will be described in detail below in conjunction with the illustrations in which.

DESCRIPTION OF THE PREFERRED EMBODIMENT

Figure 1:
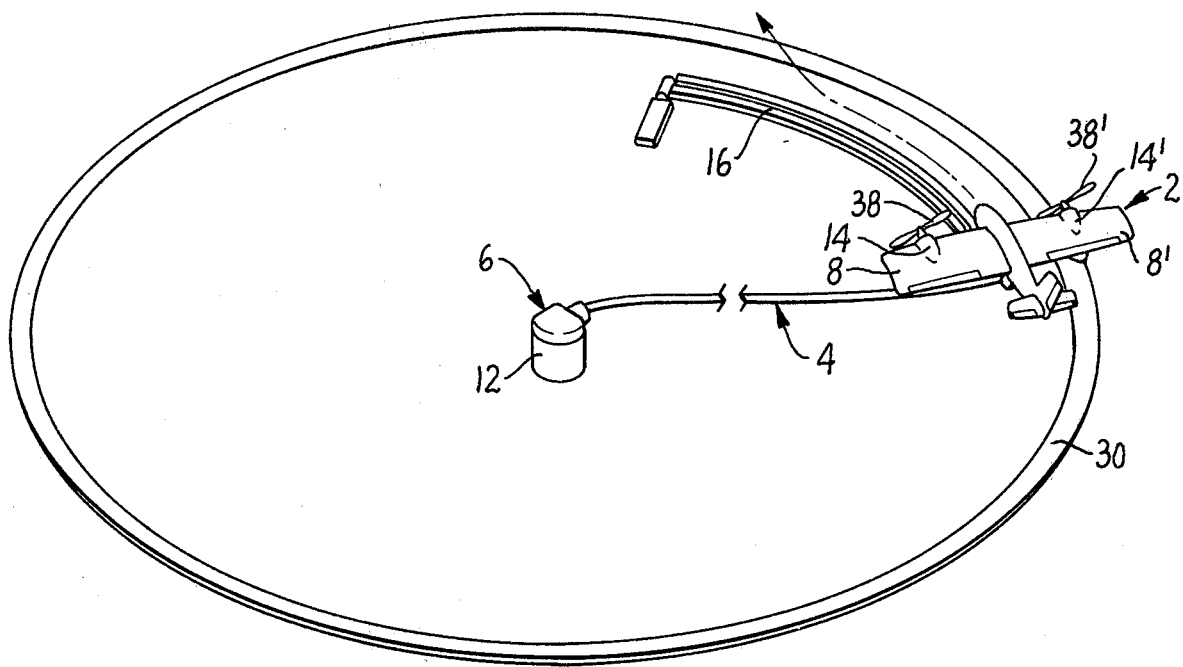
FIG. 1 is a perspective view of a preferred embodiment of this invention at rest on the ground.

In the illustrations a particularly preferred embodiment of the apparatus of this invention is illustrated. FIG. 1 illustrates the basic components of the apparatus including the vehicle 2 in the form of a high speed kite configured like an airplane, and a tether for linking the vehicle 2 to a base 6 at a preferred ground location.

The kite vehicle 2 is an aerodynamic structure generally similar in configuration, and suitably in size, to a large, twin-engine, propeller driven airplane. Similar to such an airplane, the principal aerodynamic structures are the wings 8 and 8' and the tail-mounted rudder and elevator control services. The wings suitably include aelerons and may, if desired, include such lift control devices as flaps and spoilers.

Figure 4:
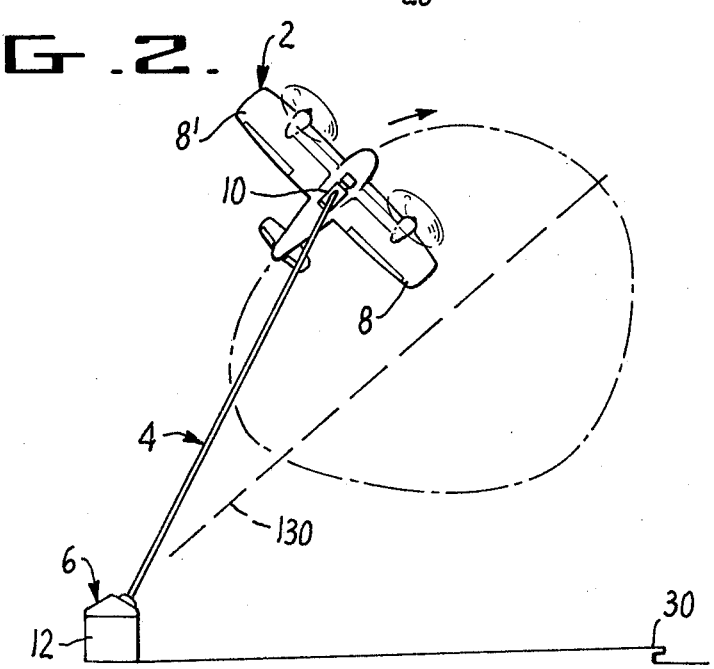
FIG. 4 illustrtes the flight of the vehicle of FIG. 1 around a closed path.

The tether 4, which may be of a length on the order of one thousand feet or more, is attached to the underside of the vehicle 2. By this pivotal mounting the vehicle can be rolled abouts its longitudinal center line while exerting substantially only longitudinal forces on the tether 4. The radially inner end of the tether 4 is attached to the ground station 6, which in FIGS. 1 and 4 is shown enclosed by a housing 12. This base 6 is rotatable 360° in azimuth and may include an attachment for the tether which is either pivotable in elevation or which is pre-set at some desired elevational angle.

By the attachment of the opposite ends of the tether to the kite vehicle 2 and to the ground base 6, the vehicle may be flown, depending upon wind conditions, anywhere in a generally hemispherical surface, all points of which are spaced from the ground base 6 a distance defined by the extension of tether 4.

Upon the respective wings 8 and 8' of the vehicle 2 are mounted nacelles 14 and 14' which carry the power extracting turbines, which will be described in detail below. If desired, these nacelles 14 and 14' could also house engines of sufficient power for take-off of the vehicle 2, to be shut down during the power extracting process. However, in the interest of minimum weight in the vehicle, it may be desired to accelerate the vehicle to flying speed through the use of a catapult 16, which, while curved in its track, may be of generally conventional configuration well known in the art. By the use of such a catapult, the vehicle 2 may be accelerated to flying speed and then launched into the desired flight path, without the necessity for carrying the weight of engines on board the vehicle.

Figure 3:
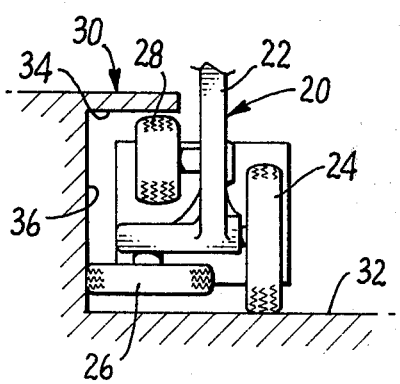
FIG. 3 is a fragmentary view of a portion of the landing gear of the vehicle of FIGS. 1 and 2 and the guide track which that landing gear engages.

Since the sag or catenary of the tether 4 would normally tend to cause the tether to drag along the ground during landing and take-off, the ground base 6 is made of substantial height, and the landing gear and runway arrangement for this vehicle is provided with means for exerting substantial tension upon the tether 4, even during take-off and while the vehicle is at rest. This structure includes the main landing gear 18, which may suitably be of tandem wheel or "bicycle" configuration, and outboard landing gear assembly 20, mounted to and retractable into the outboard nacelle 14'. This outboard landing gear 20 includes support 22, main wheel 24, lateral wheel 26 and auxialiary upward wheel 28, as illustrated in FIG. 3. This outboard landing gear 20 cooperates with a track 30 formed adjacent the outer periphery of the take-off and landing path of the vehicle 2. Track 30 includes a lower vertical support surface 32, upper vertical support surface 34 and lateral support surface 36. Thus, main wheel 24 of the outboard landing gear 20, in combination with the main landing gear 18, supports the downward force of the weight of the vehicle 2 when it is at rest. Lateral wheel 26, working against the generally vertical surface 36 of the track 30 serves to resist the radially inward pull exerted by the tension on and weight of the tether 4 on the vehicle when at rest. The upward wheel 28 of the outboard landing gear 20 cooperates with the horizontal surface 34 of the track 30 to help prevent the outboard landing gear 20 from riding up out of the track 30 as a result of the moment exerted by the tether 4 being attached to the aircraft above the contact of the main landing gear 18 with the ground. While main wheel 24 could be positioned to resist both upward and downward forces on the outboard landing gear 20, such dual use could subject that main wheel 24 to rapid reversals of rotation and resulting excessive tire wear, problems overcome by the use of auxiliarly wheel 28. When the vehicle 2 is moving at a speed sufficient for flight, the resulting centrifugal force exerted on the tether 4 may enable the vehicle to move sufficiently radially outward from the ground base 6 to enable the outboard landing gear 20 to move radially outward from its position of engagement with the track 30, thus enabling vehicle 2 to lift free of engagement with that track 30.

Figure 5:
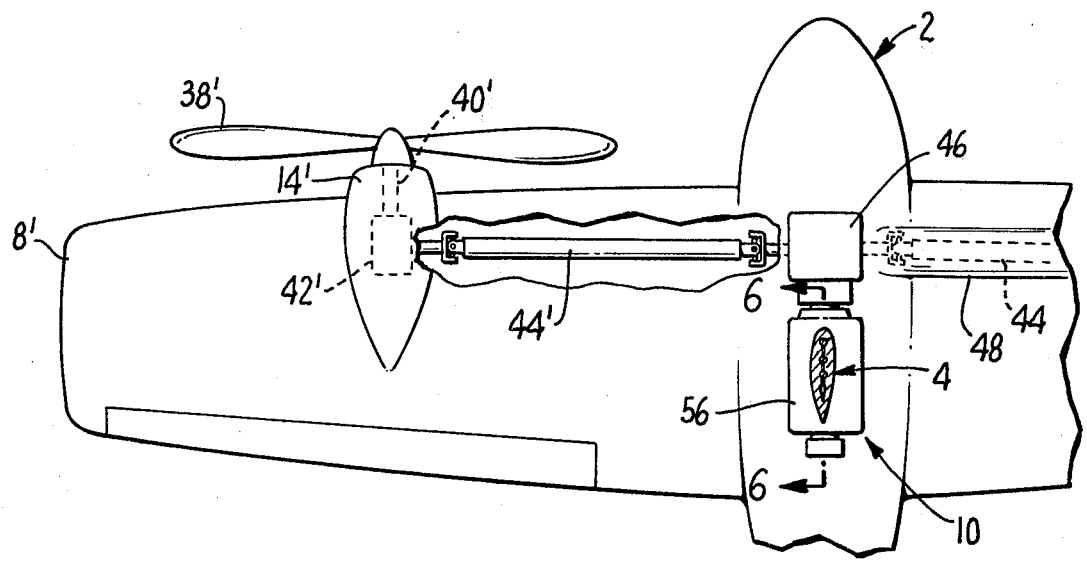
FIG. 5 is a fragmentary plan view, in section, of the vehicle of FIG. 1.
Figure 6:
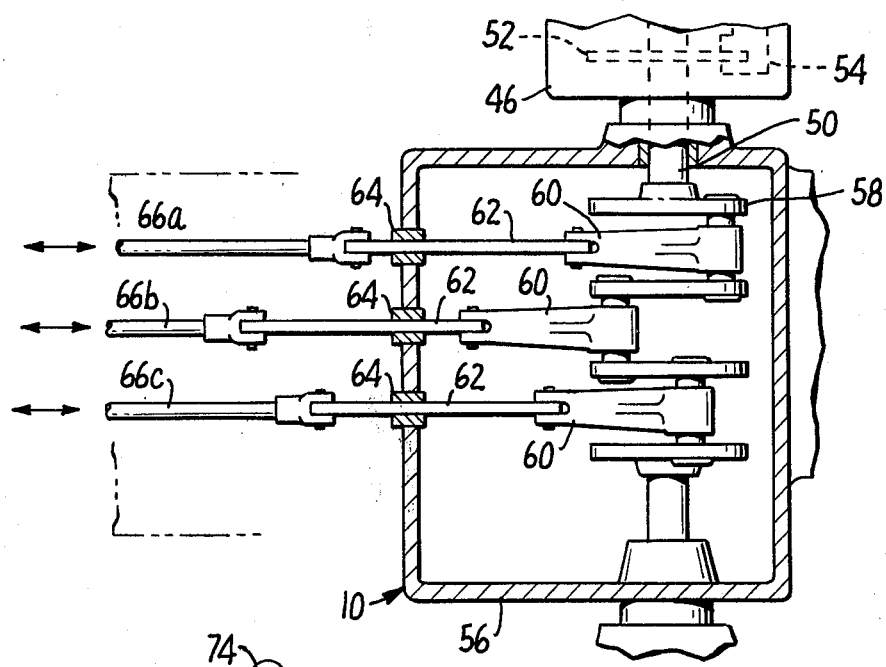
FIG. 6 is an enlarged sectional view of crank mechanism of the vehicle of FIG. 5.

The apparatus for the extraction of power from the movement of the vehicle through the air is shown more clearly in FIGS. 5 through 9. In FIG. 5, a fragmentary plan view partially in section of the vehicle 2, are illustrated the basic components. Each nacelle, in this case nacelle 14', carries a turbine (38') which is rotated by a movement of the air longitudinally past the vehicle and thus past the turbine. This turbine 38' is carried by shaft 40', which is mounted to right angle drive 42' and is supported by suitable bearings. From right angle drive 42' suitable shafting 44', along with appropriate universal joints, extends inwardly to differential or right angle drive 46. If desired the shafts 44 and 44' could run through the center of the wings 8 or 8' or they may be carried within fairing 48 and 48' (not shown).

As shown in FIG. 5 the output from differential or right angles 46 may be by means of an output shaft 50 extending generally parallel to the longitudinal axis of the vehicle 2. Within the differential housing 46 a disc 52 may be mounted to shaft 50 for cooperation with caliper 54 to form a disc brake assembly to hold the turbines 38 fixed when desired.

Affixed to differential putshaft 50 and journalled to housing 56 of the tether attachment 10 is a crank 58. While this crank 58 is illustrated as having three lobes, each angularly positioned 120° away from the next, it should be clear that the crank could have any number of lobes, preferably three or more. Connecting rod 60 mounted to the wrist pins of the crank 58, drive guide rods 62 in the direction indicated by the arrows in FIG. 6, those guide rods 62 sliding axially through suitable bushings 64. These guide rods 62 are in turn connected to tether members 66a, 66b and 66c.

As previously noted, crank housing 58 is pivotally attached to vehicle 2 for pivoting movement about an axis coincident with the axis of shaft 50 and crank 58.

Figure 7:
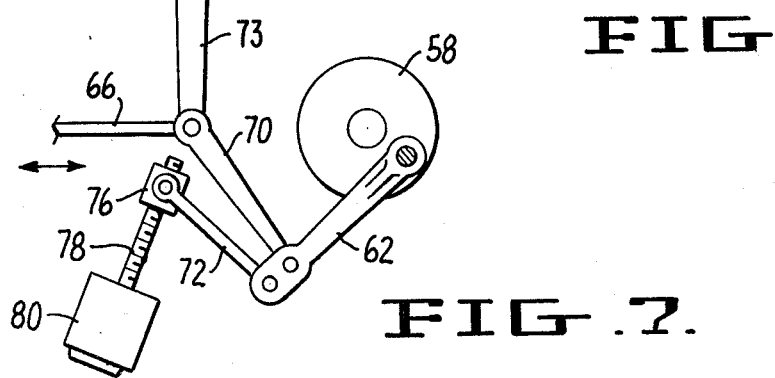
FIG. 7 is a schematic representation of an acoustic impedence matching arrangement for use with the crank assembly of FIG. 6.

If desired, additional structure could be incorporated into the crank assembly in housing 56 to provide for selective adjustment of the movement imparted to guide rods 62 and tether members 66a, b and c. One embodiment of such a throw adjusting structure, for use with one of the three lobes of crank 58, is shown in FIG. 7. As with the embodiment described above, connecting rod 62 is pivotally connected to the wrist pin of crank 58. However, in this embodiment the opposite end of the connecting rod 62 is connected both to secondary connecting arm 70 and to control arm 72. The end of secondary arm 70 distal connecting rod 62 is pivotally connected both to one of the tether members 66 and to a pivot arm 73 which, in turn, is mounted to housing 56 by pivot pin 74. The end of pivotal control arm 72 distal the connecting rod 62 is pivotally mounted to a nut member 76 carried on a threaded shaft 78 which may be driven for rotation in both clockwise and counterclockwise direction by selectively controlled motor 80, mounted to the housing 56.

With the structure of FIG. 7 applied to each of the crank 58 lobes, the motion of the outer end of connecting rod 62 is constrained to an arc defined by the pivoting movement of control arm 72. The aforementioned linkage thus provides for movement of the tether member 66 in a substantially axial direction, indicated by the arrows in FIG. 7. By controlling the motor 80 the nut member 76 may be positioned either near the outer end of the threaded shaft 78, or adjacent the motor 80, or any position in between. When positioned adjacent the outer end, the linkage provides for a minimal movement of tether member 66 from rotation of crank 58. Conversely, when the nut member 76 is moved closer to the motor 80, the throw of the tether member 66 will be increased. By controlling the position of the nut member 76 a desired length of throw for the movement of the tether members 66 may be provided, despite the constant amplitude throw on the crank 58.

Figure 8:
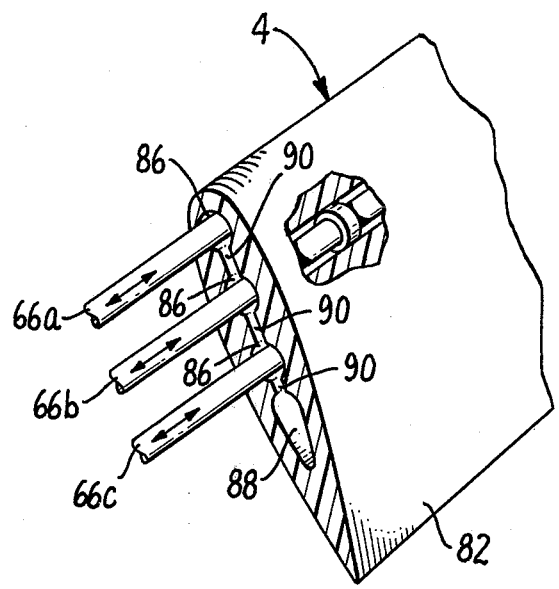
FIG. 8 is a fragmentary view, partially in section, of a portion of the tether of the apparatus of FIG. 1.

In FIG. 8 is shown a section of the tether assembly 4. This assembly comprises generally the three reciprocating tether members 66a, b and c carried within a streamlined, aerodynamic shroud 82, formed of a suitable lightweight material, such as a synthetic resin and held against any such reciprocation. Passages 86 are provided through the shroud 82 for each of the reciprocating members 66a, b and c, such passages being sufficiently enlarged to provide for inclusion of low friction bushings 84 placed at spaced intervals for carrying the reciprocating members 66a, b, and c. In addition to the passages 86 for the reciprocating members 66, an additional chamber 88 may be provided extending along a substantial portion if not the entire length of housing 82. This chamber 88 is linked at spaced intervals by transverse coupling passages 90 to the reciprocating member passages 86, which are themselves linked by such passages 90. By this provision, the shroud 82 may serve not only to reduce any acoustic coupling from the reciprocating motion of the tether members 66 to the atmosphere, but may also provide for acoustic damping within the shroud 82 of any acoustic energy generated. Thus, the cavity 88 serves as an acoustic muffler, with the transverse coupling cavities 90 serving as coupling ports between the muffler and the reciprocating member passages 86. The size and positioning of the various cavities and passages may be determined by techniques well known to those skilled in the art.

Figure 9:
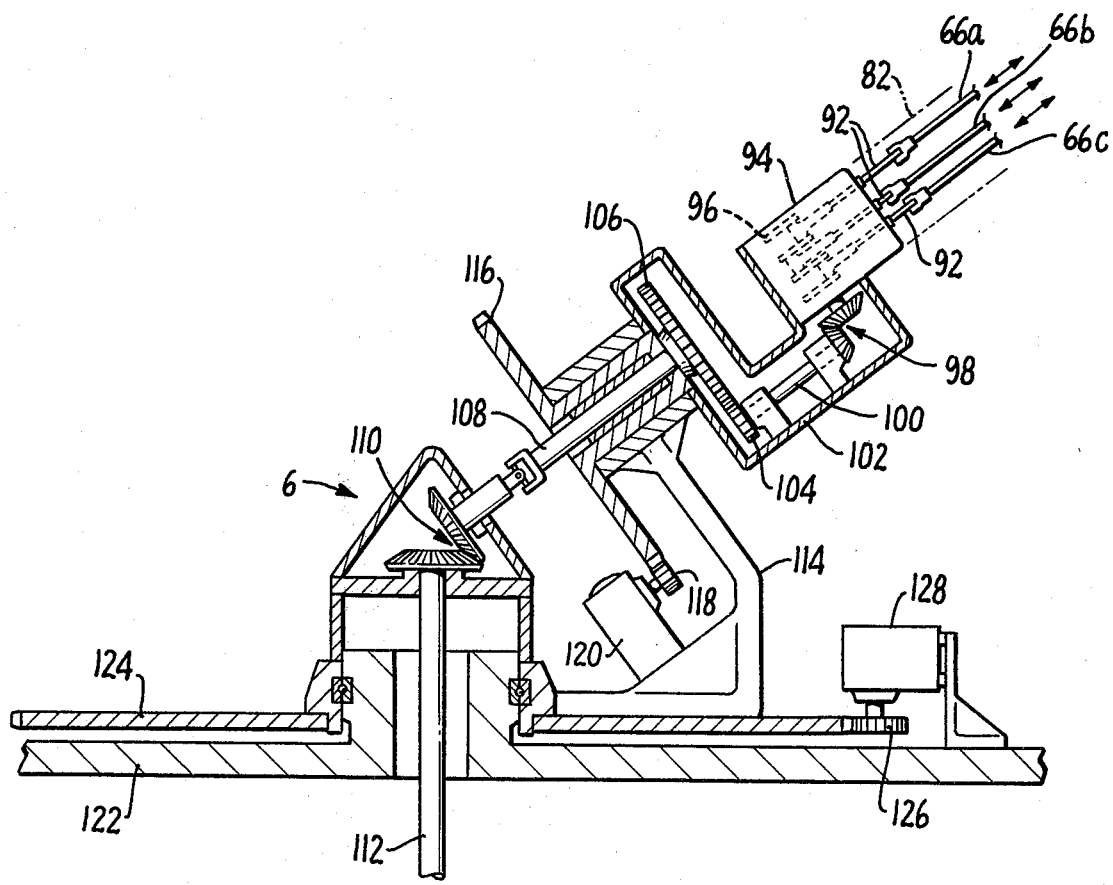
FIG. 9 is a side sectional view of the ground mounted tether base and motion converting apparatus of FIG. 1.

The ground base 6 for this invention, without the housing 12, is shown in the sectional elevation view of FIG. 9. As shown, the reciprocating tether members 66a, b and c, enclosed within the shroud 82 (shown in phantom for clarity) are attached to guide rods 92 extending through suitable bushings into housing 94 which contains a crank assembly generally similar to that denoted as item 10 and mounted to the vehicle 2. Thus the reciprocating tether members 66 serve to drive a crank 96 (shown in phantom) in a rotary manner, such crank being journaled within the housing 94. The output of this crank 96 is transmitted through bevel gear assembly 98 to shaft 100 which is journaled to housing 102, which also carries the crank assembly housing 94. Shaft 100 drives pinion 104 which meshes with and drives gear 106 in a rotary manner, thus driving shaft 108. Shaft 108, through suitable universal joint and stub shaft arrangement, drives bevel gear assembly 110 and thus output shaft 112.

Housing 102 is journaled to support 114 for rotation about the axis of shaft 108. Gear 116 affixed to housing 102 is driven by pinion 118 which, in turn, is driven by selectively controlled motor 120, for purposes to be described below.

Mount 114 carrying housing 102, is rotatably mounted to a ground base plate 122 for azimuthal rotation about the axis of shaft 112. A large gear 124 is attached to the structure including support 114 and is driven by pinion 126 which, in turn, is driven by selectively controlled motor 128, again for the puposes to be described below. Thus, rotation can be effected both in the azimuthal direction about the axis of the shaft 108.

From the description of the apparatus of this invention as described above may now be seen the method of operation. Prior to launching, with the vehicle at rest on the ground, the propeller-like turbines 38 and 38' are feathered by a suitable mechanism to present substantially no drag during take-off. At this time also, the brake assembly defined by disc 52 and caliper 54 may be engaged to hold those turbine blades fixed. Then, the vehicle is accelerated, by means of catapult 16, to flying speed, and a speed sufficient that centrifugal force enables the outer landing gear 20 to move radially outward from and free of the guide track 30. With this freedom from the guide track 30 the vehicle may then be lifted off, through conventional and suitably remote control of various aerodynamic control surfaces, this movement being in an arcuate direction defined by the tether 4. Once the landing gear is free of the guide rail 30, vehicle pulls up into the air, the landing gear retracts and the vehicle flies at a low altitude a distance around the circle defined by the tether sufficient to place it on the down wind side of the circle. Then, through suitable and well known control means, the kite pulls up and rolls about 90° such that the tether now projects substantially straight and out the bottom of the vehicle, as shown in FIG. 4. At this point the vehicle may then enter a relatively stable airborne orientation, flying in a closed path at the end of the tether 4, such path suitably being generally circular about a tilted axis 130. Such a pattern is inherently stable for a properly trimmed kite vehicle on the down wind side of the circle. Other suitable paths could be oval shaped and elongated in a direction generally parallel to the ground.

Figure 2:
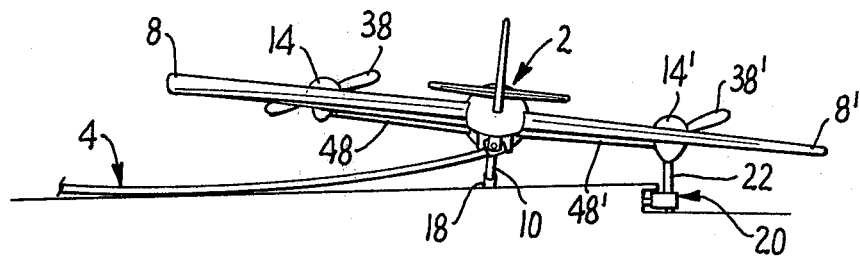
FIG. 2 is a rear view of the vehicle of FIG. 1 illustrating the relationship of the landing gear to its guide tracks.

For the generally circular path of flight of FIG. 4, it may be noted that the wing 8 of the vehicle extending generally radially inwardly of the circular path travels an inherently shorter distance than does the radially outer wing 8'. Thus, if the two wings 8 and 8' were substantially symmetrical, the lower speed of the air over inner wing 8 would cause that wing to generate less lift than would outer wing 8', moving at a faster speed through the air. Accordingly, as shown in FIG. 2, wing 8 may be formed asymmetrically of wing 8' such that each wing will provide substantially equal aerodynamic lift to the vehicle during the movement around the path illustrated in FIG. 4. Suitably this asymmetry may be provided by incorporating a slight twist or chord-wise droop into wing 8. By this arrangement the vehicle is providing stable lift and is in stable flight around the path illustrated in FIG. 4.

With the vehicle in its stable airborne orientation, making periodic oscillations through the air in the form of orbits around the path illustrated in FIG. 4, the apparatus for extracting power from the air may be activated. To achieve this, the engagement of caliper 54 with the brake disc 52 is released and pitch is introduced into the turbine blades 38 and 38' such that their movement through the air will then begin rotating at high speed, in a manner analogous to a windmill. As these turbines 38 and 38' are rotated by air passing over the blade, the rotary motion is transmitted through shafts 44 and 44' to the differential 46 and thence to the crank and output assembly 10 pivotally mounted to the bottom of the vehicle. In this crank assembly 10 the rotary motion from input shaft 50 thus effects rapid reciprocation of the tether members 66a, b and c. Since the lobes of the crank 58 are angularly spaced apart, each of the reciprocating members 66a, b and c has a phase relation with respect to the reciprocating motion from the crank 58 that is different from that of any of the other reciprocating members. Thus, the tether members 66a, b and c are alternately pulled toward and away from the vehicle, by the combination of the action of the crank 58 mounted to the vehicle and the crank 96 mounted to the ground base. It should be noted that the tensile stress imparted by the vehicle upon the tether 4 is borne entirely by the reciprocating members 66a, b, and c the shroud 82 providing only for an aerodynamic fairing. The acoustic energy generated by the rapid reciprocation of the member 66a, b and c is damped, as previously described, by the use of coupling ports 90 and acoustic muffling chamber 88 within the aerodynamic shroud 82. Additionally, any excessive stress resulting from standing waves that might be created by the long tether length compared to the acoustic wave length may be attenuated by adjusting the throw of the crank through the apparatus of FIG. 7 incorporated into the crank housing 10 mounted to the vehicle. Such an impedance matching arrangement as that of FIG. 7 may also be incorporated into the ground base for similar purposes.

To avoid twisting of the tether and to maintain it aligned closely with the vehicle, the ground base 6, illustrated in more detail in FIG. 9, provides mechanism for tracking the vehicle. Thus, the crank housing 94 is rotated by motor 120 and pinion 118 engaging gear 116 such that the chord of the aerodynamic shroud 82 is substantially aligned with the direction of movement of air over the tether or at a predetermined desired angle of the tack thereto. In FIG. 9 the ground base is illustrated with the shroud 82 in a generally vertical orientation such as would by the case when the vehicle is in a vertical climb. By this control, through conventional control structures, of the angle of attack of the shroud with respect to the air, any drag associated with the tether can be minimized.

The tether is further maintained in general alignment with the vehicle by rotating the mount by which support 114 is mounted to the ground plate 122. Again, through suitable control circuitry this mount 114 and thus the ground base tether crank arrangement may be kept in azimuthal alignment with the vehicle at the other end of the tether. The mount 114 provides for a desired angle of inclination of the crank assembly 94 with respect to the plane of the ground so that the stress exerted upon the tether members by the vehicle in flight is generally straight out from the crank assembly housing 94. Additionally, if desired, the crank assembly 94 could be mounted to housing 102 by means providing for limited pivoting about the axis of crank 96 to further facilitate the orientation of the gear box tracking the position of the vehicle as it is flown about its path.

Thus, from the foregoing it may be seen that power may be extracted from the movement of the vehicle through the air by the rotation of the turbines 38, conversion of this rotational motion and power to reciprocating motion, and transmission of this reciprocating motion along the tether to the ground. Then on the ground, if rotary motion is desired, the reciprocating motion may be reconverted into rotary motion by the crank 96 and transmitted through shaft 108 to final output shaft 112, where it may be available for powering an electric generator, water pump, or other power consuming apparatus. Thus, the power is extracted from the movement of the vehicle through the air with no requirement that the load motion be synchronous with the motion of the vehicle. By flying the vehicle transverse to the direction of the wind, much greater power production can be obtained than would be the case if the vehicle were maintained stationary facing into the wind. Thus, efficient extraction of power from the wind may be obtained.

When it is desired to land the vehicle 2, the sequence of events associated with the take-off is essentially repeated in reverse. The turbines 38 and 38' are feathered and then locked by the brake arrangement and then the aircraft is brought down to land, with the centrifugal force created by the still substantial speed of the vehicle holding the vehicle far enough out that, with the landing gear extended, the outer landing gear is at least slightly outward of the guide track 30. Then as the vehicle 2 is slowed and the tension on the tether 4 pulls the vehicle slightly toward the ground base 6, the engagement of the outward landing gear 20 with the guide track 30 will hold the vehicle in its arcuate or circular path as it is braked to a stop. All of the necessary control functions may be performed in a conventional manner through the use of well known servo systems. The signals controlling those control functions may be transmitted from the ground to the vehicle by various means, such as by radio signals, or through cables extending along the tether.

While the foregoing describes a particularly preferred embodiment of the apparatus of this invention, it is to be understood that this description is illustrative only of the principles of the invention and is not to be considered limitative thereof. Accordingly, the scope of this invention is to be limited solely by the claims appended hereto.

What is claimed is:

1. Wind driven apparatus for the production of power at a ground location comprising
   vehicle means responsive to the motion of surrounding air for generating lift and maintaining a stable airborne orientation, said orientation comprising periodic oscillations through the air;
   means carried by said vehicle and responsive to the relative motion between the air and said oscillating vehicle means for extracting mechanical power therefrom;
   means carried by said vehicle for converting said extracted power to reciprocating motion; and
   tether means linking said vehicle means to a ground location and defining the maximum radius of said oscillations, said tether means including for both bearing the entire tensile stress imparted by said vehicle means on said tether means and for transmitting said reciprocating motion along said tether means to said ground location said means for bearing said tensile stress and for transmitting said reciprocating motion comprising a plurality of members connected between said vehicle means and said ground location and mounted for reciprocation along said tether means, each said reciprocating member having a phase relation with respect to said reciprocating motion which is different from that of any other said reciprocating member.

2. The apparatus of claim 1 further comprising means at said ground location for converting said reciprocating motion into rotary motion.

3. The apparatus of claim 1 further comprising vehicle tracking means associated with said ground motion converting means for maintaining said ground motion converting means oriented in a predetermined direction relative to the radial direction of said vehicle from said ground location.

4. The apparatus of claim 1 wherein said tether comprises a first portion restrained against any reciprocating motion longitudinally thereof and a second portion reciprocatingly movable relative to said first porion.

5. The apparatus of claim 4 wherein said tether second portion is internal to said tether first portion.

6. The apparatus of claim 4 wherein said tether first portion comprises a streamlined shroud for said tether second portion.

7. The apparatus of claim 6 further comprising a tether base at said ground location for anchoring said tether to the ground, said tether base including means for maintaining said streamlined shroud at a predetermined angle of attack with respect to the air moving over said tether.

8. The apparatus of claim 4 wherein said tether first portion includes acoustic damping means for attenuating noise generated by reciprocating movement of said tether second portion.

9. The apparatus of claim 1 wherein said means for converting said extracted power to reciprocating motion includes means for selectively adjusting the magnitude of the stroke of said reciprocating motion, whereby stress resulting from standing waves created by the long tether length compared to the acoustic wave length may be attenuated.

10. The apparatus of claim 1 wherein said vehicle comprises an aerodynamic lifting vehicle and wherein said apparatus further comprises means for accelerating said vehicle through the air in an arcuate path defined by said tether to achieve said airborne orientation.

11. The apparatus of claim 10 further comprising landing gear affixed to said vehicle for supporting said vehicle upon the ground when not in said airborne orientation, and guide means affixed to the ground and cooperating with said landing gear for restraining movement of said vehicle, while in contact with the ground, to said arcuate path.

12. The apparatus of claim 1 wherein said periodic oscillations comprise a closed path, all points of which are spaced from said ground location a distance defined by said tether.

13. The apparatus of claim 12 wherein said vehicle comprises an aerodynamic winged vehicle, and wherein said closed path comprises a generally circular path with one wing of said vehicle extending generally radially inwardly of said circular path and another wing extending generally radially outwardly of said circular path, and wherein said respectively inwardly and outwardly extending wings are of asymmetric configuration such that each said wing provides substantially equal aerrodynamic lift to said vehicle during its movement along said path, whereby the lift produced by the lower speed movement of the inwardly extending wing through the air may be substantially balanced with the lift produced by the higher speed movement of the outwardly extending wing through the air.

* * * * *